United States Patent [19]

Buckley et al.

[11] 3,917,656

[45] Nov. 4, 1975

[54] CHEMICAL COMPOUNDS

[75] Inventors: John Buckley; Richard Budziarek; Andrew John Nicholas; Edward Jervis Vickers, all of Manchester, England

[73] Assignee: Imperial Chemical Industries Limited, London, England

[22] Filed: Jan. 18, 1974

[21] Appl. No.: 434,640

[30] Foreign Application Priority Data

Jan. 24, 1973 United Kingdom............... 3578/73

[52] U.S. Cl. ............. 260/349; 117/138.5; 260/157; 260/207.1; 260/249.6; 260/308 B; 260/463; 260/404.5

[51] Int. Cl.² ..................................... C07C 117/00

[58] Field of Search ................................... 260/349

[56] References Cited

UNITED STATES PATENTS

| 3,324,148 | 6/1967 | Cotter................................ | 260/349 |
| 3,631,183 | 12/1971 | Breslow............................... | 260/349 |

*Primary Examiner*—Lewis Gotts
*Assistant Examiner*—Cary Owens

*Attorney, Agent, or Firm*—Cushman, Darby & Cushman

[57] ABSTRACT

Azidoformates in which there is at least one group of the formula

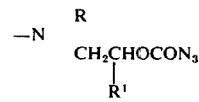

attached to an aromatic nucleus, R representing an alkyl group of from 1 to 4 carbon atoms or a group of the formula

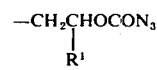

and $R^1$ representing hydrogen, chlorine, bromine, an alkyl radical of from 1 to 4 carbon atoms or a chloromethyl radical. The aromatic nucleus may be substituted. The azidoformates are useful for the treatment of polymeric materials.

2 Claims, No Drawings

CHEMICAL COMPOUNDS

This invention relates to certain novel compounds containing the azidoformate group, to the manufacture of such compounds and to their use as bonding agents and as agents for providing valuable surface treatments on polymeric materials particularly synthetic polymeric textile materials.

According to the present invention there are provided azidoformates in which there is at least one group of the formula

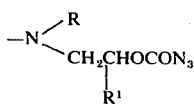

attached to an aromatic nucleus, R representing an alkyl group of from 1 to 4 carbon atoms or a group of the formula

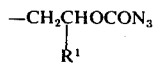

and $R^1$ representing hydrogen, halogen or an alkyl radical of from 1 to 4 carbon atoms which may optionally be substituted.

Examples of R include methyl, ethyl, propyl, butyl and the group of the formula

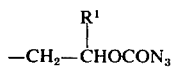

wherein $R^1$ is as exemplified below.

Examples of $R^1$ include hydrogen, methyl, ethyl, propyl, butyl, chloromethyl, chlorine and bromine.

The aromatic nucleus may be any of the known aromatic nuclei for example the benzene, naphthalene, diphenyl, anthracene or anthraquinone nuclei. Further examples of aromatic nuclei include those wherein two or more aromatic rings are joined by a linking group X and have the formula Aromatic — X — Aromatic ring Examples of the linking group X include — $CH_2$—, —$(CH_2)_n$—, — $C(alkyl)_2$—, —O—, —$SO_2$—, —CO—, —S—, —$O(CH_2)_nO$—, —N = N—, —NHCONH—, —$NHCOR^2CONH$ —, —OCONH—, —$NHCOOR^2$—OCONH—,

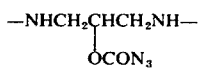

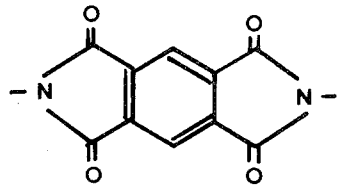

and — $NHCO(C_2H_4O)_nCONH$ — wherein $n$ is an integer and $R^2$ represents an alkyl, aryl or aralkyl group.

Thus azidoformates of the invention containing two groups of the formula

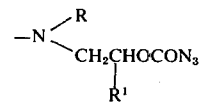

may have the two groups attached to an aromatic nucleus which is a simple aromatic ring structure such as benzene or naphthalene or may be attached to each of two simple aromatic ring structures joined together by the type of linking group exemplified above.

Polyfunctional azidoformates containing groups of the formula

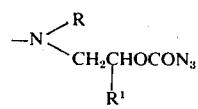

attached to three or more aromatic rings are also included within the scope of the invention.

Examples of aromatic nuclei containing three or more aromatic rings to which the group of the formula

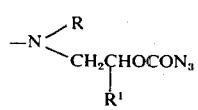

may be attached include

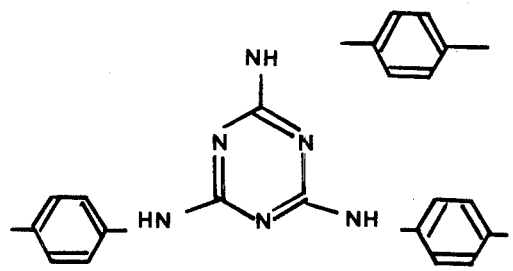

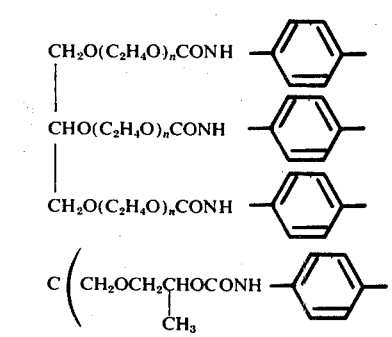

and compounds similar to the above polyethenoxy compounds but derived from sugars such as mannitol and sucrose in place of glycerol and pentaerythritol.

The aromatic nucleus or nuclei may be substituted by one or more substituents. Examples of such substituents include alkyl, halogen, nitro, cyano, —OR², —N(R²)₂, —NHCOR²,

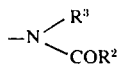

—NHCOOR², —NHSO₂R²,

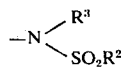

— OCOR², —SO₂N(R²)₂, —COOR²,
wherein R² and R³ are aliphatic or aromatic radicals, said aliphatic radicals including long chain and short chain radicals and unsaturated radicals such as isopropenyl. Examples of further substituents which may be present in the aromatic nucleus or nuclei include hydroxy, carboxylic acids and sulphonic acids and their salts, —NHCONH₂, —NCO, —CON₃, —N₃, —OCON₃, —SO₂N₃, $C_nF_{2n+1}$CONH— and $C_nF_{2n+1}$ where $n$ is 4 to 12, CH₃O(CH₂CH₂O)ₘCONH — and C₂H₅O(CH₂CH₂O)ₘCONH — where $m$ is >6,

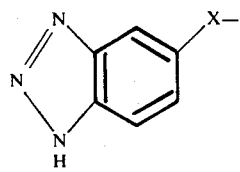

where X is a linking group such as azo or —NHCONH—, aryl azo for example C₆H₅—N=N— where the C₆H₅ may be mono or disubstituted.

The azidoformates of the present invention may be made by the reaction of sodium azide with chloroformates containing at least one group of the formula

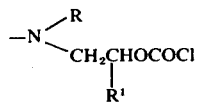

attached to an aromatic nucleus.

This may be achieved by stirring a solution of the chloroformate in an unreactive organic solvent, such as methylene dichloride, chloroform, ether, toluene, etc. with an aqueous solution of sodium azide, at 0°–40°C for 1 – 24 hours.

The chloroformates used as starting materials may be made by reacting phosgene with the corresponding hydroxy compounds in known manner.

The azidoformates of the invention are useful for application to polymeric substrates for example synthetic polymeric textile materials such as polyesters, polyamides and polyacrylonitrile. Also to polymers, polyethylene, polypropylene and saturated and unsaturated rubber. They may be applied to polymeric substrates by a simple padding process using a solution of the azidoformate in a suitable solvent for example a halogenated hydrocarbon such as perchloroethylene or methylene dichloride and may be fixed on the substrate by a baking at say, 100° – 200°C.

The finish obtained on the polymeric substrate varies with the constitution of the remainder of the molecule, i.e. the non-azidoformate portion, and it is possible to produce a variety of effects on the polymeric substrate, for example polymeric fibres and textile materials may be treated to obtain water or oil repellency, anti-static, anti-soil, wash fast finishes.

Polyfunctional derivatives can be used as bonding agents between two polymeric substrates. Synthetic fibres can be dyed with coloured compounds containing one or more azidoformate groups by padding from a solvent and baking as described in Example 3.

The invention is illustrated by the following examples in which all parts and percentages are by weight except where otherwise stated.

EXAMPLE 1

Liquid phosgene (20 parts) was added to a suspension of calcium carbonate (10 parts) and magnesium sulphate (5 parts) in methylene dichloride (20 parts). To this stirred mixture at room temperature was added a solution of N-ethyl-N-β-hydroxyethylaniline (16.5 parts) in methylene dichloride (100 parts) over 1 hour. The reaction mixture was stirred at room temperature for a further 1 hour, after which time the excess phosgene was blown off with a stream of dry nitrogen. The residual mixture was diluted with methylene dichloride (50 parts), filtered and the filtrate added over 5 minutes to a suspension of sodium azide (30 parts) in methylene dichloride (20 parts) and the reaction mixture stirred with No. 4 Ballotini beads (10 parts) for 16 hours. The reaction mixture was filtered, the filter cake washed with methylene dichloride (3 × 20 parts) and the filtrates combined. The total methylene dichloride solution was then evaporated to dryness under reduced pressure to give the derived β-azidoformate as a pale yellow oil (22 parts) having the structure:

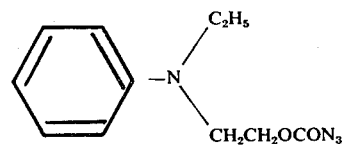

EXAMPLE 2

A solution of acryloyl chloride (27 parts) in diethyl ether (100 parts) and a solution of sodium carbonate (40 parts) in water (300 parts) were added concomitantly to a stirred mixture of 4-amino-N-ethyl-N-β-hydroxyethylaniline sulphate (70 parts), water (250 parts), ether (100 parts) at 0°–5°C under an atmosphere of nitrogen. The reaction mixture was stirred for 1½ hours at room temperature after which time the yellow product was filtered off, washed twice with cold water (150 parts) and dried at 70°C in a vacuum oven to yield the desired 4-acrylamido-N-ethyl-N-β-hydroxyethylaniline (55 parts).

This intermediate (48 parts), calcium carbonate (50 parts) and methylene dichloride (150 parts) were ground together to a thin slurry which was added over 30 minutes to liquid phosgene (76 parts) and the mixture stirred for 18 hours at room temperature. The excess phosgene was blown off with a stream of dry nitrogen and the thick slurry diluted with methylene dichloride (100 parts).

A suspension of sodium azide (65 parts) in cold water (30 parts) was added over 15 minutes at 10°–15°C to the above slurry of the chloroformate. After stirring for 18 hours at room temperature cold water (150 parts) was added, and the aqueous phase separated and further extracted with methylene dichloride (2 × 75 parts). The combined methylene dichloride solutions were washed twice with cold water (100 parts) and then dried over magnesium sulphate. Removal of the solvent under reduced pressure left a pasty solid which after trituration with ether gave the azidoformate as a white solid, m.p. 89°–90°C (40 parts) of the formula:

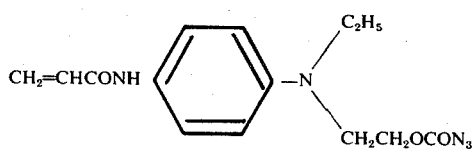

EXAMPLE 3

A solution of p-nitroaniline (28 parts) in a mixture of concentrated hydrochloric acid 36°Tw (10 parts) and water (10 parts) was cooled to 0° in an ice bath, and the amine diazotised by the addition of a solution of sodium nitrate (14 parts) in water (50 parts). The diazo-solution was now added to a solution of β-(N-ethylanilino)-ethylazidoformate(46.8 parts) in acetone (100 parts). After stirring for 10 minutes at room temperature the precipitated product was collected and washed with cold water (3 × 150 parts). The filter cake was then dried over phosphorous pentoxide in a vacuum desiccator to give the azo-dye as a fine red powder (42 parts) of the formula:

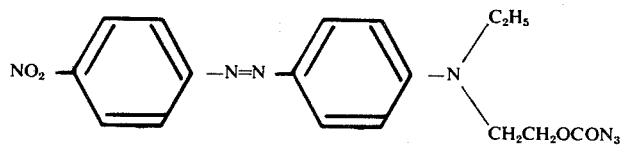

The same product was obtained by reacting N-ethyl-N-β-hydroxyethyl-4-(4'-nitrophenylazo-)aniline (0.62 parts) in methylene dichloride (20 parts) with liquid phosgene (2 parts) in the presence of calcium carbonate (0.5 parts) for 16 hours at room temperature. The excess phosgene was blown off with a stream of dry nitrogen. The resulting mixture was diluted with methylene dichloride (20 parts) and filtered. The solution of the derived chloroformate was now added to a suspension of sodium azide (0.5 parts) in methylene dichloride (5 parts) to which No. 8 Ballotini beads (1 part) had been added and stirred for 2 hours at room temperature. The resulting mixture was filtered to yield a deep red solution of the azidoformate of the parent dyestuff.

Using p-chloroaniline as diazo component instead of the p-nitroaniline and β-(N-ethylanilino)-ethylazidoformate as the coupling component and orange-red dyestuff was obtained having the formula:

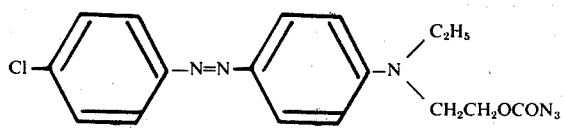

Terylene and nylon filament fabrics were impregnated with solutions of the above azo-dyestuffs in perchloroethylene (1–2 %), and dried so that the fabrics retained 0.5–1.0 % of the dyestuffs on weight of the fabric. The fabrics were then baked in an air oven under the conditions varying from 30 minutes at 120°C to 1 minute at 200°C. The dyed fabrics were resistant to extractions with organic solvents, such as perchloroethylene, chlorobenzene, toluene and acetone, indicating excellent fixations of the dystuffs to the fabric substrate.

EXAMPLE 4

2N Aqueous hydrochloric acid (100 parts by volume) was added to a solution containing 5-amino-benzotriazole (5.36 parts), sodium hydroxide (2.4 parts), and sodium nitrite (11.04 parts) in water (96.5 parts), at 0°C with stirring. The mixture was stirred for 10 minutes at 0°C and then added to a solution of the product of Example 1 (9.36 parts) in acetone (112 parts) and water (27.8 parts) at 0°C with stirring. The mixture was then stirred for 1 hour at 0°C, treated with sodium acetate until the mixture was no longer acidic to Congo Red paper, and concentrated by evaporation under reduced pressure at room temperature. The solid which separated was collected by filtration and recrystallised from aqueous ethanol to give the product, m.p. 116°–118°C, having the structure:

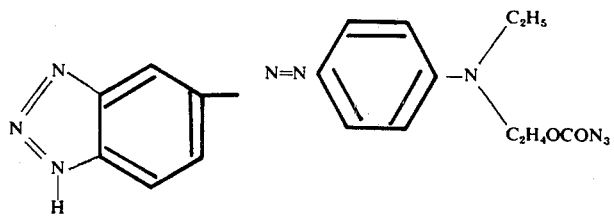

EXAMPLE 5

Polyethylene glycol monomethyl ether of molecular weight approximately 750 (75 parts) was dissolved in methylene dichloride (100 parts) and added over 30 minutes to liquid phosgene (40 parts) at 10°C. The mixture was then stirred at 30°–35°C for 3 hours after which time the excess phosgene was blown off with a stream of dry nitrogen. The residue was diluted with methylene dichloride (75 parts) to give a colourless solution of the derived chloroformate. This solution of chloroformate and a solution of sodium carbonate (16 parts) in water (100 parts) were added concomitantly to a solution of p-amino-N-ethyl-N-β-hydroxyethylaniline sulphate (28 parts) in water (100 parts). The resulting mixture was stirred for 3 hours at room temperature, the aqueous phase was then separated and extracted with methylene dichloride (2 × 75 parts). The combined methylene dichloride solutions were washed twice with cold water (50 parts) and then dried over magnesium sulphate. The methylene dichloride solution containing the product of structure

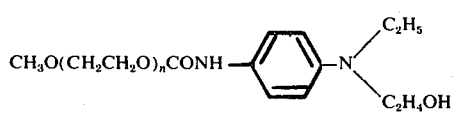

was now reacted with liquid phosgene (30 parts) at 30°–35°C for 18 hours. The excess phosgene was blown off with a stream of dry nitrogen, the residual mixture diluted with methylene dichloride (100 parts) and filtered to give a clear solution of the required chloroformate. The chloroformate solution was now added to a mixture of sodium azide (35 parts) and methylene dichloride (20 parts) and the mixture stirred with No. 4 Ballotini beads (15 parts) for 18 hours. The reaction mixture was filtered, the filter cake washed with methylene dichloride (3 × 20 parts) and the combined filtrate and washings evaporated under reduced pressure to yield the required azidoformate (83 parts) having the structure:

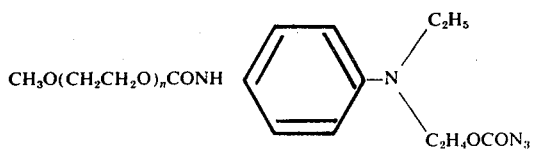

EXAMPLE 6

Polyethylene glycol of molecular weight approximately 1000 (250 parts) was heated to 40°C and phosgene (55 parts) bubbled in with stirring at the rate of about 1.0 part per minute. The reaction mixture was stirred at 40°C for 3 hours and excess phosgene removed under reduced pressure using nitrogen to give a residue of bis-chloroformate. A portion of this chloroformate (36 parts) was dissolved in methylene dichloride (150 parts) and the solution added dropwise over a period of 1 hour to a solution of 4-amino-N-ethyl-N-β-hydroxyethylaniline (36 parts) in a mixture of methylene dichloride (300 parts) and diethyl ether (100 parts) at 5°C, with stirring, in an atmosphere of nitrogen. The reaction mixture was allowed to stir at 5°C for a further 3 hours, then evaporated under reduced pressure to about half its bulk and stirred with a solution of sodium hydroxide (1–30 parts) in water (10 parts). The methylene dichloride layer was separated, washed well with water and dried over anhydrous sodium sulphate. The filtered solution containing the compound of the formula

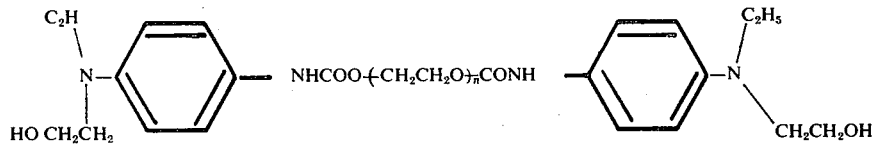

was added to a solution of phosgene (20 parts) in methylene dichloride (50 parts) over a period of 1 hour at 5°C with stirring, and the stirring maintained for a further 3 hours at 10°C. Excess phosgene was removed with nitrogen to give a solution of the chloroformate

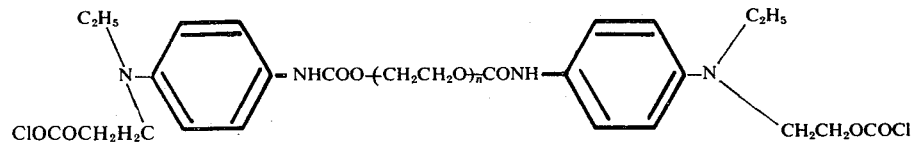

in methylene dichloride. To this solution were added Ballotini glass beads No. 8 (100 parts) and sodium azide (40 parts) and the mixture was stirred vigorously for 72 hours. The reaction mixture was filtered and the filtrate was evaporated under reduced pressure to give the required azidoformate of the formula:

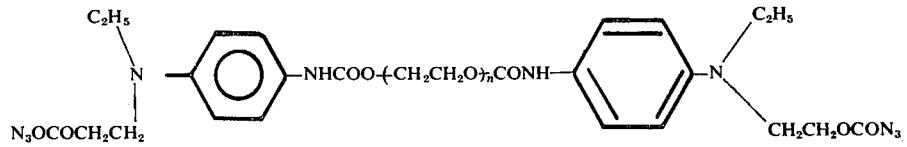

EXAMPLE 7

Oxyethylated glycerol (282.5 parts) having a molecular weight of 1130 was heated to 40°C and phosgene (83.0 parts) was bubbled into the liquid with stirring at a rate of about 0.8 part per minute. The reaction mixture was stirred at 40°C for a further 3 hours and excess phosgene then removed under reduced pressure with nitrogen. A portion of the chloroformate so obtained (29.2 parts) was added dropwise over a period of 1 hour with stirring at 5°C to a solution of 4-amino-N-ethyl-N-β-hydroxyethylaniline (36 parts) in methylene dichloride (375 parts) and diethyl ether (125 parts). The reaction mixture was then stirred at 5°C for a further 3 hours. Solvents were removed under reduced pressure and the residue treated with a solution of sodium hydroxide (0.9 part) in water (200 parts). The product was extracted with methylene dichloride (200 parts), the extract washed several times with small portions of water and then dried over anhydrous sodium sulphate to give a solution containing the product of formula

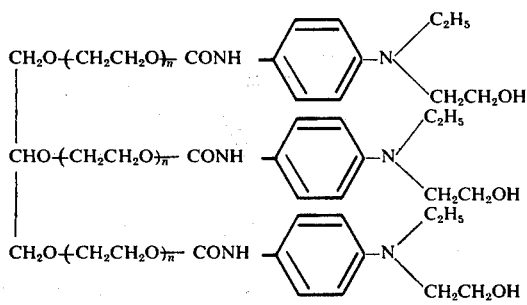

where $n$ = approximately 8. This solution was then added dropwise with stirring over a period of 1 hour to a solution of phosgene (50 parts) in methylene dichloride (100 parts) ay 5°C and the reaction mixture stirred at 5°C for 3 hours more. Excess phosgene was removed under reduced pressure using dry nitrogen to give a solution of chloroformate in methylene dichloride. To this was added sodium azide (15 parts) and Ballotini glass beads No. 8 (100 parts). The mixture was stirred vigorously for 60 hours at room temperature, filtered and the filtrate evaporated under reduced pressure to give the azidoformate of structure

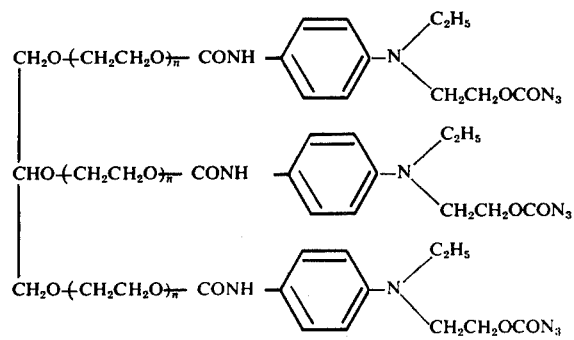

where $n$ = approximately 8.

EXAMPLE 8

Terylene filament fabric, previously extracted with cold perchloroethylene to extract any residual surface lubricants, and then dried, was impregnated in methylene chloride solutions of the products of Examples 6 and 7 the patterns dried and then baked in an air-oven for 10 minutes at 150°C or 1–2 minutes at 175°C. The patterns were then extracted with cold perchlorethylene to remove soluble, unreacted finish, dried again, and then laundered for 1 hour at 65°C in a solution of "Persil." At each stage the dried patterns were weighed to determine the amount of finish remaining on the fibre. Repeat experiments showed good reproducibility. As a control there was similarly applied a simple polyethylene glycol bis-azidoformate prepared from the same polyethylene glycol used as starting material in Example 6 by reacting the derived chloroformate directly with sodium azide. The results of these tests are given in the following table, and demonstrate very clearly the superior properties, especially in wash-fastness, of polyethylene oxide derivatives containing the grouping

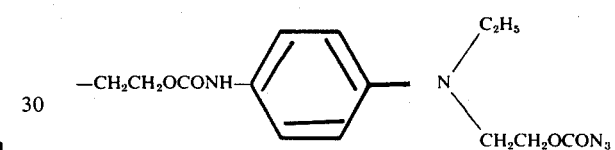

to the simpler derivatives containing only the grouping —$CH_2CH_2O$ $CON_3$

| Agent Applied | Baking Conditions | % Finished On Fabric After Baking | % of Finished Retained After | |
|---|---|---|---|---|
| | | | Cold Solvent Extraction | 1 Hour Detergent Wash (Persil) |
| O[($CH_2CH_2O)_nCON_3$]$_2$ (Control) | 10 min./150°C | 1.3 | 60 | (None Detectable) |
| Product of Example 6 | 10 min./150°C | 2.0 | 81 | 60 |
| Product of Example 7 | 10 min./150°C | 2.2 | 92 | 70 |
| " | ½–1 min./175°C | 1.0 | 94 | 51 |

EXAMPLE 9

To a solution of 4-amino-N-ethyl-N-β-hydroxyethylaniline (1.8 parts) was added per-fluorooctanoyl chloride (1.44 parts), dropwise with stirring under nitrogen over 10 minutes at 5°C. The mixture was stirred at 5°C for 3 hours longer under nitrogen, the diethyl ether then removed under reduced pressure and the residue triturated with water (150 parts) containing dissolved sodium hydroxide (0.133 part). The solid was filtered off, washed well with water, dried and then recrystallised from toluene to yield the product, m.p. 99.5° – 100°C, having the formula:

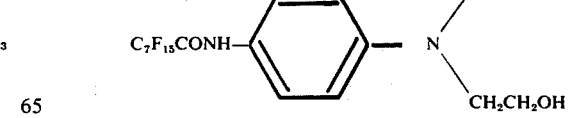

This was converted to the chloroformate by dissolving in methylene dichloride (20 parts) and then adding dropwise to a solution of phosgene (1.0 part) in methylene dichloride (10.0 parts) at 5°C with stirring over 30 minutes. The mixture was stirred at 5°C for 3 hours longer and excess phosgene blown off with a stream of dry nitrogen. The residue of chloroformate was diluted with methylene dichloride (10 parts), sodium azide (1.0 part) and Ballotini glass beads No. 8 (10 parts) were added, and the mixture stirred vigorously for 72 hours at room temperature. The glass beads were filtered off and the filtrate evaporated under reduced pressure to give the azidoformate having the structure:

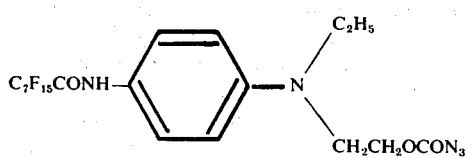

The fluorocarbon azidoformate so prepared, when applied to Terylene or nylon 66 after the manner described in Example 8 gives wash-fast oil and water-repellent finishes with superior retention to that obtained with other azidoformates such as $C_7F_{15}COOCH_2CH_2OCON_3$ or $C_7F_{15}CON(CH_2CH_2OCON_3)_2$.

We claim:

1. Azidoformates of the formula

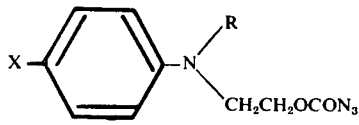

wherein R is an alkyl group of from 1 to 4 carbon atoms and X is selected from the group consisting of hydrogen, acrylamido, p-nitrophenylazo, p-chlorophenylazo,

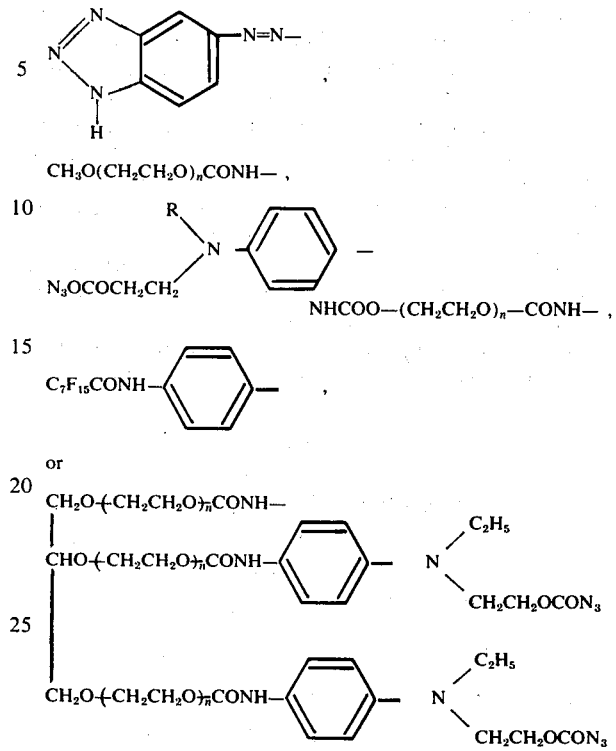

where $n$ is greater than 6 and R is as defined.

2. An azidoformate of the formula

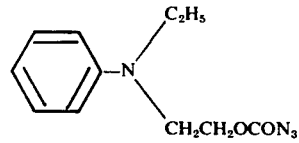

* * * * *